(12) United States Patent
Chai et al.

(10) Patent No.: US 7,999,880 B2
(45) Date of Patent: Aug. 16, 2011

(54) THIN FILM TRANSISTOR ARRAY PANEL AND MANUFACTURING METHOD THEREOF

(75) Inventors: Chong-Chul Chai, Seoul (KR); Cheol-Woo Park, Suwon-si (KR); Kyoung-Ju Shin, Yongin-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 292 days.

(21) Appl. No.: 11/291,399

(22) Filed: Dec. 1, 2005

(65) Prior Publication Data
US 2006/0119758 A1 Jun. 8, 2006

(30) Foreign Application Priority Data
Dec. 3, 2004 (KR) .................. 10-2004-0100915

(51) Int. Cl.
G02F 1/136 (2006.01)
G02F 1/1333 (2006.01)
G02F 1/1343 (2006.01)
(52) U.S. Cl. ..................... 349/43; 349/122; 349/139
(58) Field of Classification Search .......... 349/43, 349/122, 139
See application file for complete search history.

(56) References Cited

U.S. PATENT DOCUMENTS

| | | | |
|---|---|---|---|
| 5,576,858 A * | 11/1996 | Ukai et al. ................ | 349/42 |
| 6,025,892 A * | 2/2000 | Kawai et al. .............. | 349/43 |
| 6,278,503 B1 | 8/2001 | Nishikawa et al. | |
| 6,414,730 B1 * | 7/2002 | Akamatsu et al. ........ | 349/43 |
| 2002/0180901 A1 * | 12/2002 | Kim .......................... | 349/43 |
| 2004/0070713 A1 * | 4/2004 | Song ........................ | 349/129 |
| 2004/0160560 A1 * | 8/2004 | Kim et al. ................ | 349/129 |
| 2004/0227882 A1 * | 11/2004 | Ham ......................... | 349/124 |
| 2005/0110924 A1 * | 5/2005 | Kim et al. ................ | 349/111 |
| 2007/0177067 A1 * | 8/2007 | Kim et al. ................ | 349/43 |

FOREIGN PATENT DOCUMENTS

| | | |
|---|---|---|
| CN | 1517771 | 8/2004 |
| EP | 0685756 | 6/2005 |
| JP | 2004-213011 | 7/2004 |
| KR | 1020040091479 | 10/2004 |

OTHER PUBLICATIONS

English Abstract for Publication No. EP 0685756.
English Abstract for Publication No. CN 1517771.
English Abstract for Publication No. 1020040091479.
English Abstract for Publication No. 2004-213011.

\* cited by examiner

*Primary Examiner* — Mark A Robinson
*Assistant Examiner* — Jerry Blevins
(74) *Attorney, Agent, or Firm* — F. Chau & Associates, LLC

(57) ABSTRACT

A thin film transistor array panel includes a substrate, a gate line disposed on the substrate, and a capacitive electrode disposed on the substrate and separated from the gate line. The thin film transistor includes a data line intersecting the gate line, a thin film transistor connected to the gate line and the data line and including a drain electrode, and a coupling electrode connected to the drain electrode, overlapping the capacitive electrode, and having a through-hole disposed on the capacitive electrode. The thin film transistor includes a passivation layer disposed on the gate line, the data line, and the thin film transistor and having a contact hole that penetrates the through-hole and exposes the capacitive electrode, and a pixel electrode including a first subpixel electrode connected to the drain electrode and a second subpixel electrode connected to the capacitive electrode through the contact hole.

26 Claims, 8 Drawing Sheets

THIN FILM TRANSISTOR ARRAY PANEL AND MANUFACTURING METHOD THEREOF

This application claims priority to Korean patent application no. 10-2004-0100915, filed on Dec. 3, 2004, the disclosure of which is incorporated herein by reference in its entirety.

BACKGROUND OF THE INVENTION (a) Field of the Invention

The present invention relates to a thin film transistor array panel and a manufacturing method thereof.

(b) Description of Related Art

Liquid crystal displays (LCDs) are among the most widely used flat panel displays. An LCD includes two panels provided with field-generating electrodes, such as pixel electrodes and a common electrode, and a liquid crystal (LC) layer interposed therebetween. The LCD displays an image by applying voltages to the field-generating electrodes to generate an electric field in the LC layer, which controls an orientation of LC molecules in the LC layer to adjust polarization of incident light.

Among the different types of LCDs, a vertical alignment (VA) mode LCD achieves a high contrast ratio and wide reference-viewing angle. The VA mode LCD aligns (e.g., tilts) LC molecules such that the long axes of the LC molecules are perpendicular to the panels in the absence of an electric field.

The reference-viewing angle of the VA mode LCD depends upon the arrangement of cutouts in the field-generating electrodes and protrusions on the field-generating electrodes. The cutouts and the protrusions can determine the tilt of the LC molecules. The reference-viewing angle can be widened by appropriately arranging cutouts and protrusions to vary the tilt of the LC molecules.

In the VA mode LCD, poor lateral visibility can be a problem. The pixel electrodes of the VA mode LCD overlap signal lines for transmitting signals to the pixel electrodes for increasing the aperture ratio and a thick, low dielectric insulator is disposed between the pixel electrodes and the signal line for reducing parasitic capacitance between the pixel electrodes and the signal lines The thick insulator causes deep contact holes for connecting the signal lines and the pixel electrodes, etc., and thus sidewall profiles of the contact holes need to be smoothed. The smooth sidewalls of the contact holes cause light leakage, thereby degrading image quality. Although the light leakage may be substantially blocked by widening opaque members in the LCD, widened opaque members may decrease the aperture ratio.

Therefore, a need exists for a thin film transistor array panel for improving the lateral visibility in LCDs.

SUMMARY OF THE INVENTION

A thin film transistor array panel according to an embodiment of the present invention includes a substrate, a gate line disposed on the substrate, and a capacitive electrode disposed on the substrate and separated from the gate line. The thin film transistor further includes a data line intersecting the gate line, a thin film transistor connected to the gate line and the data line and including a drain electrode, and a coupling electrode connected to the drain electrode, overlapping the capacitive electrode, and having a through-hole disposed on the capacitive electrode. The thin film transistor includes a passivation layer disposed on the gate line, the data line, and the thin film transistor and having a contact hole that penetrates the through-hole and exposes the capacitive electrode, and a pixel electrode including a first subpixel electrode connected to the drain electrode and a second subpixel electrode connected to the capacitive electrode through the contact hole.

The through-hole may be substantially equidistant from two opposite edges of the capacitive electrode, and may be rectangular, octagonal, or circular.

The contact hole may have a stepped sidewall.

A distance between an edge of the contact hole and the through-hole may be equal to or greater than about 3.0 microns.

The thin film transistor array panel may further include a shielding electrode separated from the pixel electrode and overlapping a portion of the data line or the gate line. The pixel electrode and the shielding electrode may be disposed on the passivation layer.

The thin film transistor array panel may further include a storage electrode overlapping the drain electrode. The shielding electrode and the storage electrode may be supplied with substantially the same voltage. The shielding electrode may extend along the data line or the gate lines, and it may fully cover the data line.

The pixel electrode may have a chamfered corner.

The passivation layer may include an organic insulator.

The thin film transistor array panel may further include a color filter disposed on or under the passivation layer.

The pixel electrode may include a partitioning member for partitioning the pixel electrode into a plurality of partitions. The partitioning member may make an angle of about 45 degrees with the gate line.

A method of manufacturing a thin film transistor array panel according to an embodiment of the present invention includes forming a gate line and a capacitive electrode on a substrate, forming a gate insulating layer over the gate line, the capacitive electrode and the substrate, and forming a data line, a drain electrode, and a coupling electrode on the semiconductor layer and the gate insulating layer, the coupling electrode having a through-hole disposed on the capacitive electrode. The method further includes forming a passivation layer on the data line, the drain electrode, and the coupling electrode, the passivation layer having a contact hole that penetrates the through-hole and exposes the capacitive electrode, and forming a pixel electrode on the passivation layer, the pixel electrode including a first subpixel electrode connected to the drain electrode and a second subpixel electrode connected to the capacitive electrode through the contact.

The through-hole may be rectangular, octagonal, or circular and substantially equidistant from two opposite edges of the capacitive electrode.

The contact hole may have a stepped sidewall.

BRIEF DESCRIPTION OF THE DRAWINGS

The present invention will become more apparent by describing embodiments thereof in detail with reference to the accompanying drawings in which.

DETAILED DESCRIPTION OF PREFERRED EMBODIMENTS

Figure 1:
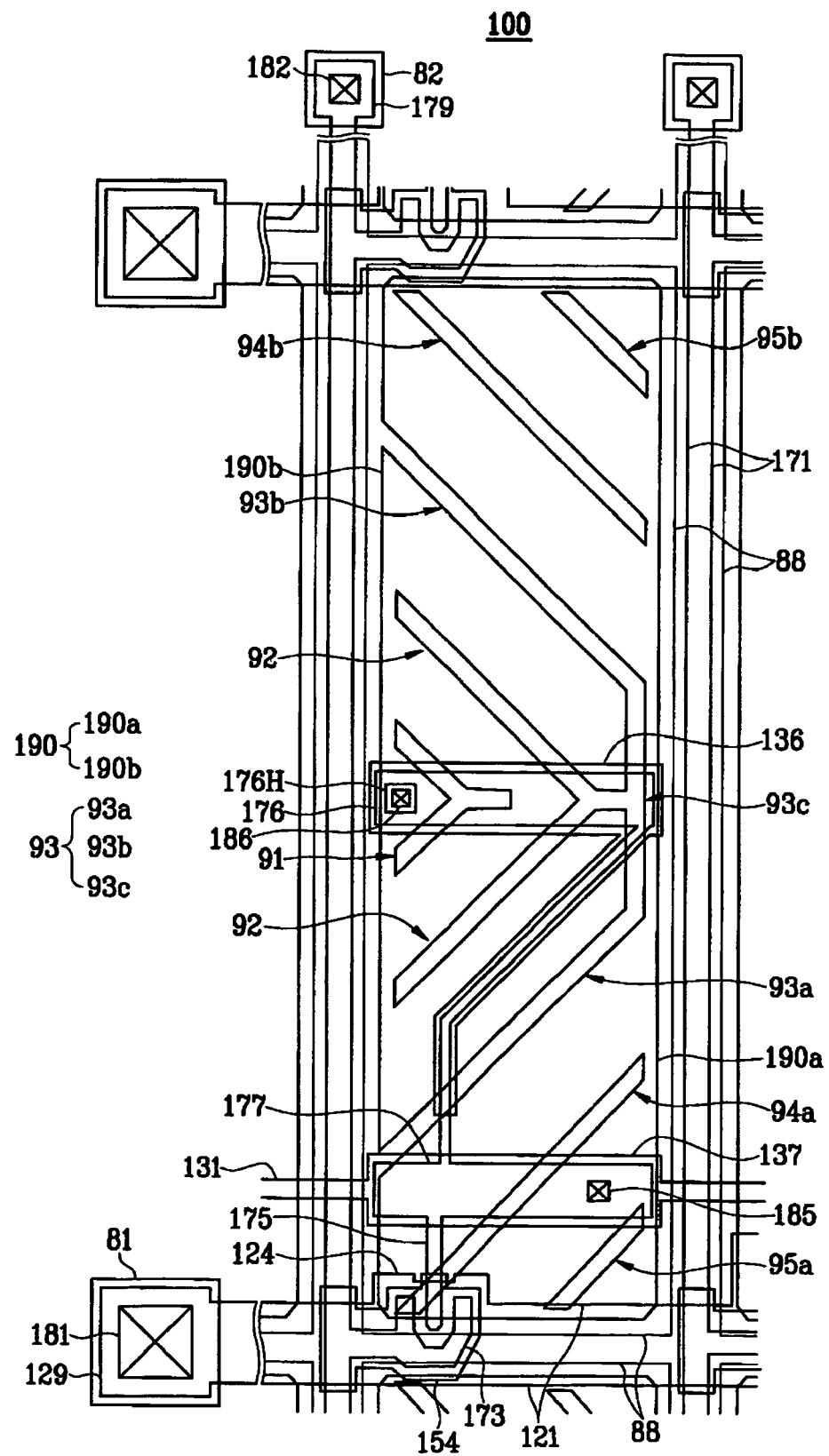
FIG. 1 is a layout view of a TFT array panel of an LCD according to an embodiment of the present invention.

The present invention now will be described more fully hereinafter with reference to the accompanying drawings, in which preferred embodiments of the invention are shown. The present invention may, however, be embodied in many different forms and should not be construed as limited to embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

An LCD according to an embodiment of the present invention will be described in detail with reference to FIGS. 1-5.

Figure 2:
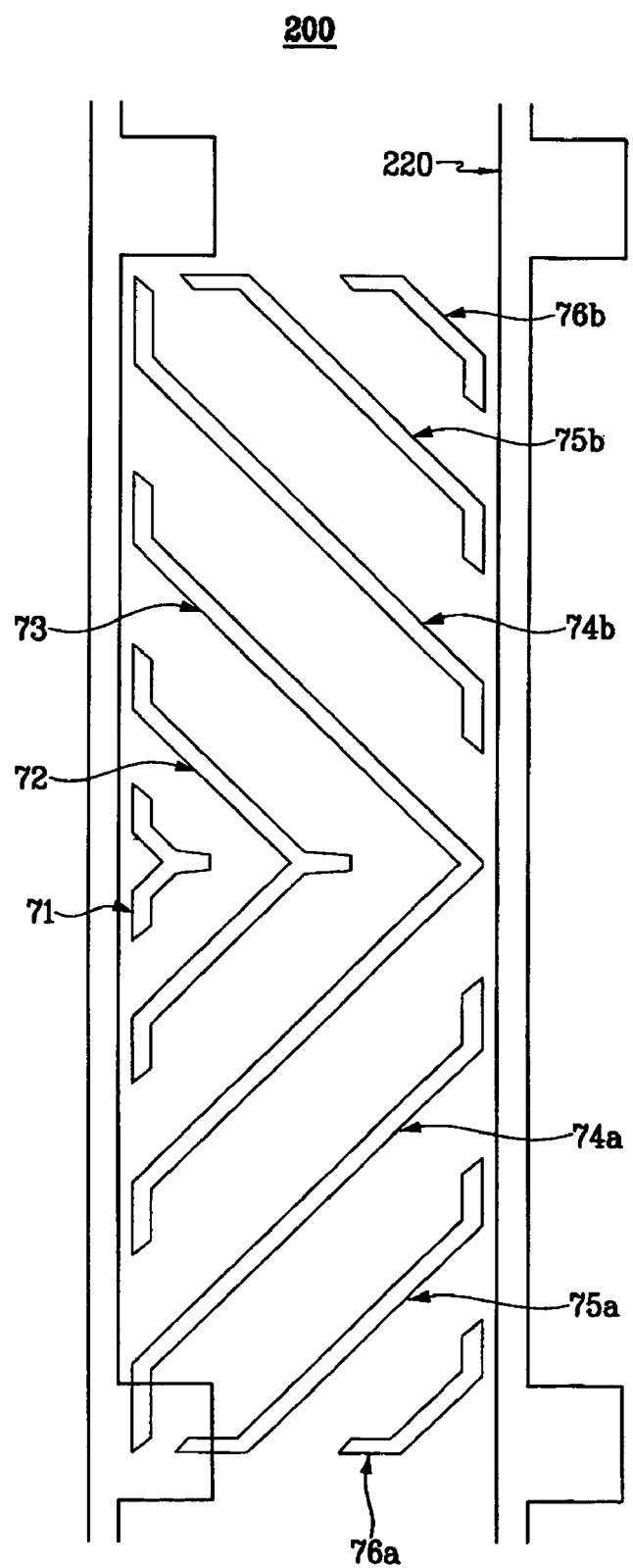
FIG. 2 is a layout view of a common electrode panel of an LCD according to an embodiment of the present invention.
Figure 3:
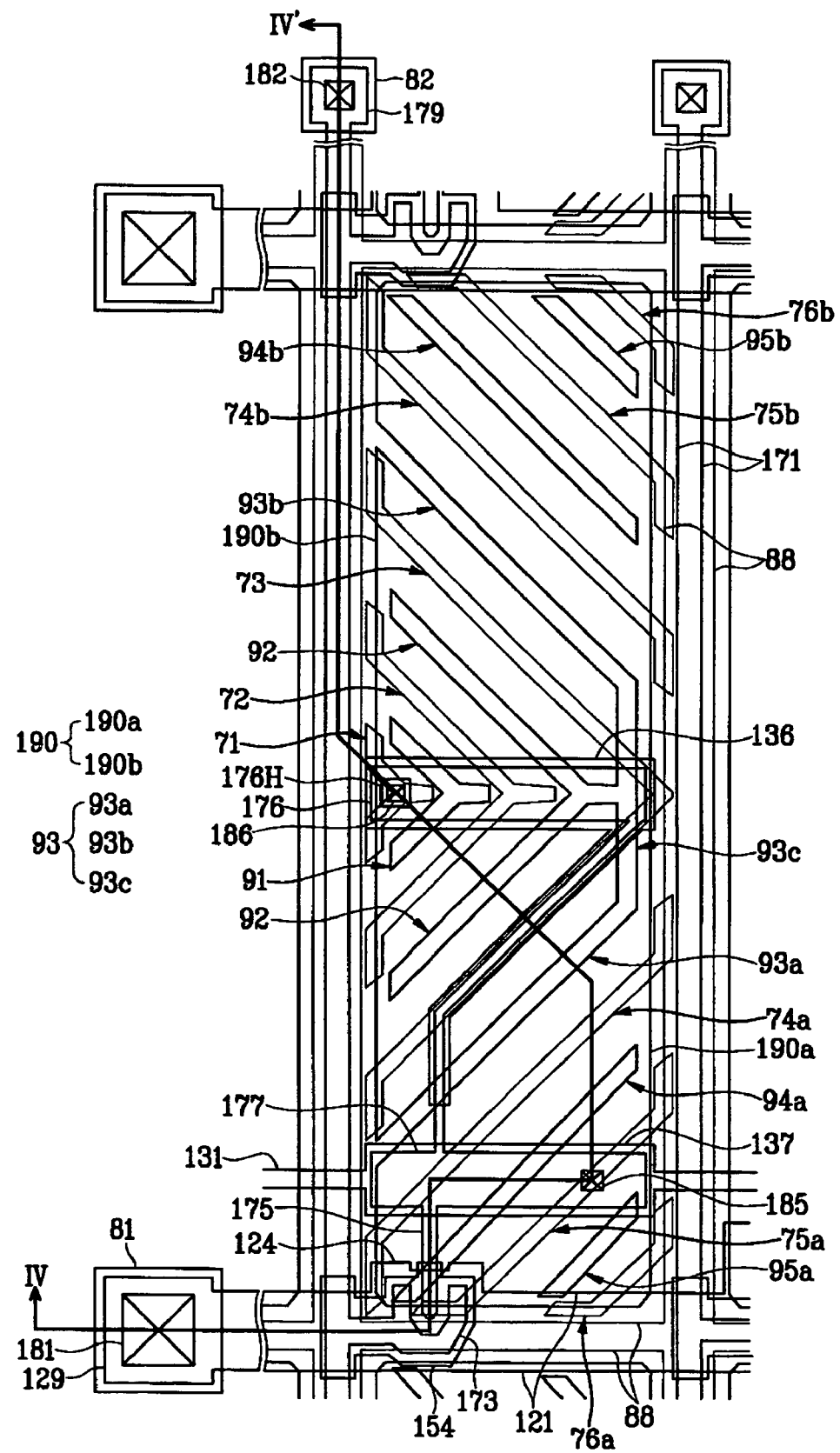
FIG. 3 is a layout view of an LCD including the TFT array panel shown in FIG. 1 and the common electrode panel shown in FIG. 2.
Figure 4:
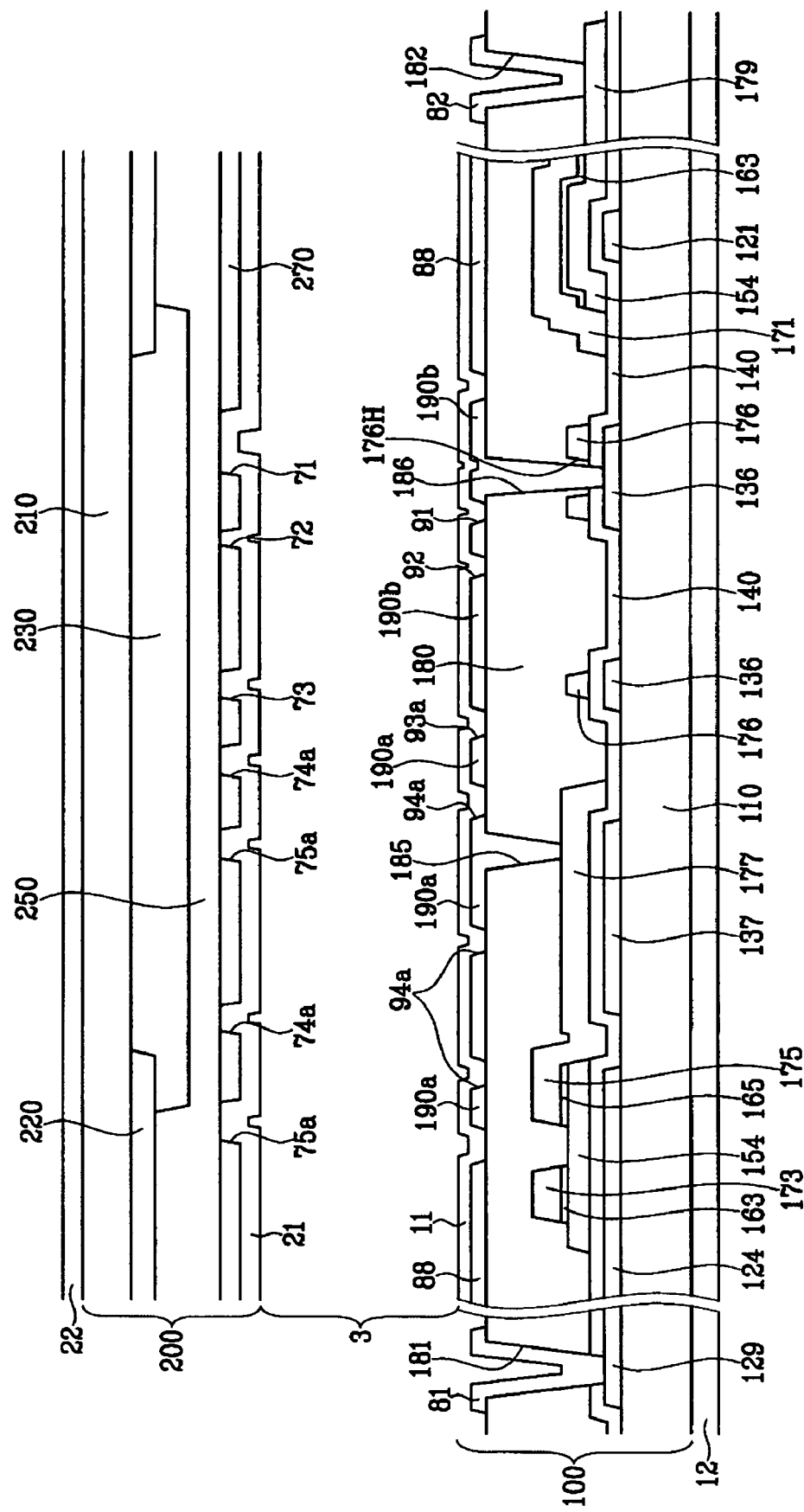
FIG. 4 is a sectional view of the LCD shown in FIG. 3 taken along line IV-IV'.
Figure 5:
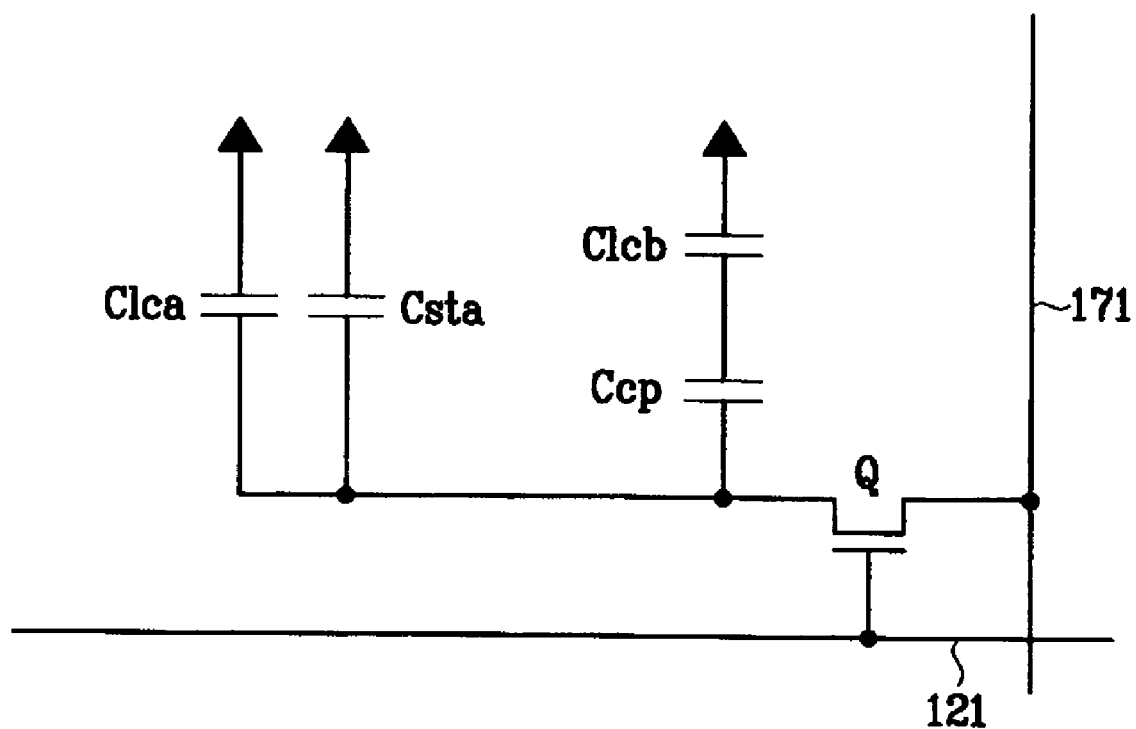
FIG. 5 is an equivalent circuit diagram of the LCD shown in FIGS. 1-4.

FIG. 1 is a layout view of a thin film transistor (TFT) array panel of an LCD according to an embodiment of the present invention, FIG. 2 is a layout view of a common electrode panel of an LCD according to an embodiment of the present invention, FIG. 3 is a layout view of an LCD including the TFT array panel shown in FIG. 1 and the common electrode panel shown in FIG. 2, FIG. 4 is a sectional view of the LCD shown in FIG. 3 taken along line IV-IV', and FIG. 5 is an equivalent circuit diagram of the LCD shown in FIGS. 1-4.

Referring to FIG. 4, an LCD according to an embodiment of the present invention includes a TFT array panel 100 (see FIG. 1), a common electrode panel 200 (see FIG. 2), and a LC layer 3 interposed between the panels 100 and 200.

The TFT array panel 100 is now described in detail with reference FIGS. 1, 3 and 4.

A plurality of gate conductors including a plurality of gate lines 121, a plurality of storage electrode lines 131, and a plurality of capacitive electrodes 136 are formed on an insulating substrate 110 such as transparent glass or plastic.

The gate lines 121 transmit gate signals and extend substantially in a transverse direction on the substrate. Each gate line 121 includes a plurality of gate electrodes 124 projecting upward and an end portion 129 having an area for contact with another layer or an external driving circuit. A gate driving circuit (not shown) for generating the gate signals may be mounted on a flexible printed circuit (FPC) film (not shown), which may be coupled to the substrate 110, directly mounted on the substrate 110, or integrated onto the substrate 110. The gate lines 121 may be connected to a driving circuit that may be integrated on the substrate 110.

The storage electrode lines 131 are supplied with a predetermined voltage and extend substantially parallel to the gate lines 121. Each of the storage electrode lines 131 is disposed between two gate lines 121 and is nearer a lower one of the two adjacent gate lines 121. Each of the storage electrode lines 131 includes a plurality of storage electrodes 137 extending upward and downward as viewed from the perspective of FIG. 1.

Each capacitive electrode 136, which are separated from the storage electrode lines 131, includes a wide transverse portion and a narrow oblique portion. The transverse portion is a rectangle elongated substantially parallel to the gate lines 121 and substantially equidistant from adjacent two gate lines 121. The oblique portion extends from a right end of the transverse portion toward a storage electrode line 131, making an angle of about 45 degrees with the gate lines 121.

The gate conductors 121, 131 and 136 are preferably made of an aluminum (Al) containing metal such as Al and Al alloy, silver (Ag) containing metal such as Ag and Ag alloy, copper (Cu) containing metal such as Cu and Cu alloy, molybdenum (Mo) containing metal such as Mo and Mo alloy, chromium (Cr), tantalum (Ta), or titanium (Ti). The gate lines 121 may have a multi-layered structure including two conductive films (not shown) having different physical characteristics. One of the two films is preferably made of low resistivity metal including an Al containing metal, a Ag containing metal, or a Cu containing metal. Such a film can reduce a signal delay or voltage drop. The other film is preferably made of material such as a Mo containing metal, Cr, Ta, or Ti. Such a film has desirable physical, chemical, and electrical contact characteristics with other materials such as indium tin oxide (ITO) or indium zinc oxide (IZO). Examples of the multi-layer structure include a lower Cr film and an upper Al (alloy) film and a lower Al (alloy) film and an upper Mo (alloy) film. The gate conductors 121, 131 and 136 may be made of various metals or conductors.

Lateral sides of the gate conductors 121, 131 and 136 are inclined relative to a surface of the substrate 110, and an inclination angle thereof ranges about 30-80 degrees.

A gate insulating layer 140, preferably made of silicon nitride (SiNx) or silicon oxide (SiOx), is formed on the gate conductors 121, 131 and 136.

A plurality of semiconductor islands 154, preferably made of hydrogenated amorphous silicon (abbreviated to "a-Si") or polysilicon, are formed on the gate insulating layer 140. The semiconductor islands 154 are disposed on the gate electrodes 124 and include extensions covering edges of the gate lines 121. A plurality of other semiconductor islands (not shown) may be disposed on the storage electrode lines 131.

A plurality of ohmic contact islands 163 and 165 are formed on the semiconductor islands 154. The ohmic contacts 163 and 165 are preferably made of n+hydrogenated a-Si, heavily doped with an n-type impurity such as phosphorous or they may be made of silicide. The ohmic contacts 163 and 165 are located in pairs on the semiconductor islands 154.

The lateral sides of the semiconductor islands 154 and the ohmic contacts 163 and 165 are inclined relative to the surface of the substrate 110, and the inclination angles thereof are preferably in a range of about 30-80 degrees.

A plurality of data conductors including a plurality of data lines 171 and a plurality of drain electrodes 175 are formed on the ohmic contacts 163 and 165 and the gate insulating layer 140.

The data lines 171 transmit data signals and extend substantially in a longitudinal direction to intersect the gate lines 121 and the storage electrode lines 131. Each data line 171 includes a plurality of source electrodes 173 projecting toward the gate electrodes 124 and an end portion 179 having an area for contact with another layer or an external driving circuit. A data driving circuit (not shown) for generating the data signals may be mounted on a FPC film (not shown), which may be coupled to the substrate 110, directly mounted on the substrate 110, or integrated onto the substrate 110. The data lines 171 may extend to be connected to a driving circuit that may be integrated on the substrate 110.

Each of the drain electrodes 175 is separated from the data lines 171 and includes a narrow end portion disposed opposite the source electrodes 173 with respect to the gate electrodes 124. The end portion of each drain electrode 175 is partly surrounded by a respective source electrode 173 that is curved like a character U.

Each drain electrode 175 further includes an expansion 177 and a coupling electrode 176 connected thereto.

The expansion 177 overlaps a storage electrode 137 and it has nearly the same shape as the storage electrode 137.

The coupling electrode 176 is disposed above a capacitive electrode 136 and has substantially the same shape as the capacitive electrode 136. In detail, the coupling electrode 176 has a wide transverse portion and an oblique portion connected to the transverse portion of the expansion 177. The transverse portion of the coupling electrode 176 has a through-hole 176H exposing the gate insulating layer 140. The through-hole 176H is disposed preferably within the boundary of the transverse portion of the coupling electrode 176 and it is preferably equidistant from lower and upper edges of the transverse portion as viewed from the perspective of FIG. 1. Although the through-hole 176H is shown to be square, it may be circular, octagonal, etc.

A gate electrode 124, a source electrode 173, and a drain electrode 175 along with a semiconductor island 154 form a TFT having an electric channel formed in the semiconductor island 154 disposed between the source electrode 173 and the drain electrode 175.

The data conductors 171 and 175 are preferably made of a refractory metal such as Cr, Mo, Ta, Ti, or alloys thereof. The data conductors 171 and 175 may have a multilayered structure including a refractory metal film (not shown) and a low resistivity film (not shown). Examples of the multi-layered structure are a double-layered structure including a lower Cr/Mo (alloy) film and an upper Al (alloy) film and a triple-layered structure of a lower Mo (alloy) film, an intermediate Al (alloy) film, and an upper Mo (alloy) film. The data conductors 171 and 175 may be made of various metals or conductors.

The data conductors 171 and 175 have inclined edge profiles, and the inclination angles thereof range between about 30-80 degrees.

The ohmic contacts 163 and 165 are interposed only between the underlying semiconductor islands 154 and the overlying data conductors 171 and 175 thereon and reduce a contact resistance therebetween. Extensions of the semiconductor islands 154 disposed on the edges of the gate lines 121 smooth the profile of the surface to substantially prevent a disconnection of the data lines 171. The semiconductor islands 154 include exposed portions, which are not covered with the data conductors 171 and 175, such as portions located between the source electrodes 173 and the drain electrodes 175.

A passivation layer 180 is formed on the data conductors 171 and 175, and the exposed portions of the semiconductor islands 154. The passivation layer 180 is preferably made of an inorganic or organic insulator, and may have a flat surface. Examples of the inorganic insulator include silicon nitride and silicon oxide. The organic insulator may be photosensitive and preferably has a dielectric constant of less than about 4.0. The passivation layer 180 may include a lower film of inorganic insulator and an upper film of organic insulator, such that the passivation layer 180 has the insulating characteristics of the organic insulator while substantially preventing the exposed portions of the semiconductor islands 154 from being damaged by the organic insulator.

The passivation layer 180 has a plurality of contact holes 182 exposing the end portions 179 of the data lines 171 and a plurality of contact holes 185 exposing the expansions 177 of the drain electrodes 175. The passivation layer 180 and the gate insulating layer 140 have a plurality of contact holes 181 exposing the end portions 129 of the gate lines 121 and a plurality of contact holes 186 penetrating the through-holes 176H without exposing the coupling electrodes 176 and exposing portions of the capacitive electrodes 136. The contact holes 181, 182, 185 and 186 have inclined or stepped sidewalls that can be obtained by using organic material.

It is preferable that the sidewalls of the contact holes 186 have smooth profiles. The smooth profile having a varying thickness may result in light leakage. The contact holes 186 are disposed on the coupling electrodes 176 and the capacitive electrodes 136, which are opaque. The opaque area formed by the coupling electrodes 176 and the capacitive electrodes 136 substantially blocks light leakage. A marginal area in the coupling electrode 176 for aligning the through-holes 176H to the contact holes 186 is needed, and the marginal area is relatively small as compared to the opaque area for blocking light leakage. Accordingly, the aperture ratio can be increased.

The edge of a contact hole 186 is sufficiently spaced apart from a coupling electrode 176 or a capacitive electrode 136 for substantially blocking light leakage and the distance between the edges is preferably greater than about 3.0 microns.

A plurality of pixel electrodes 190, a shielding electrode 88, and a plurality of contact assistants 81 and 82 are formed on the passivation layer 180. They are preferably made of a transparent conductor such as ITO or IZO or a reflective conductor such as Ag, Al, Cr, or alloys thereof.

Each pixel electrode 190 is approximately a rectangle having chamfered corners. The chamfered corners of the pixel electrode 190 make an angle of about 45 degrees with the gate lines 121. The pixel electrodes 190 overlap the gate lines 121 to increase the aperture ratio.

Each of the pixel electrodes 190 has a gap 93 that divides the pixel electrode 190 into an outer sub-pixel electrode 190a and an inner sub-pixel electrode 190b.

The gap 93 includes lower and upper portions 93a and 93b, respectively, and a longitudinal portion 93c connecting them. The lower and the upper portions 93a and 93b of the gap 93 extend from a left edge to a right edge of the pixel electrode 190, making an angle of about 45 degrees away from and towards the gate lines 121, respectively. The longitudinal portion 93c of the gap 93 connects right ends of the lower and the upper portions 93a and 93b.

The inner sub-pixel electrode 190b is an isosceles trapezoid rotated by a right angle. The outer subpixel electrode 190a includes a pair of right-angled trapezoids rotated by a right angle and a longitudinal connection connecting the right-angled trapezoids.

The outer subpixel electrode 190a is connected to an expansion 177 of a drain electrode 175 through a contact hole 185.

The inner sub-pixel electrode 190b is connected to a capacitive electrode 136 through a contact hole 186 and overlaps a coupling electrode 176. The inner sub-pixel electrode 190b, the capacitive electrode 136, and the coupling electrode 176 form a coupling capacitor.

The inner sub-pixel electrode 190b has central cutouts 91 and 92. A lower half of the outer sub-pixel electrode 190a has lower cutouts 94a and 95a, and an upper half of the outer sub-pixel electrode 190a has upper cutouts 94b and 95b. The cutouts 91, 92 and 94a-95b partition the sub-pixel electrodes 190b and 190a into a plurality of partitions. The pixel electrode 190 having the cutouts 91, 92 and 94a-95b and the gap 93 substantially has inversion symmetry across the capacitive electrode 136. Individual portions 93a-93c of the gap 93 will be also referred to as cutouts hereinafter.

Each of the lower and the upper cutouts 94a-95b obliquely extends approximately from a left corner, a lower edge, or an upper edge of the pixel electrode 190 approximately to a right edge of the pixel electrode 190. The lower and the upper cutouts 94a-95b make an angle of about 45 degrees to the gate lines 121, and they extend substantially perpendicular to each other.

Each of the center cutouts 91 and 92 includes a transverse portion and a pair of oblique portions connected thereto. The transverse portion extends along the capacitive electrode 136, and the oblique portions obliquely extend from the transverse portion toward the left edge of the pixel electrode 190 in parallel to the lower and the upper cutouts 94a-95b, respectively. The transverse portion of the center cutout 92 is connected to the longitudinal portion 93c of the gap 93.

The number of the cutouts or the number of the partitions may be varied depending on design factors such as the size of the pixel electrode 190, the ratio of the transverse edges to the longitudinal edges of the pixel electrode 190, the type and characteristics of the liquid crystal layer 3, and so on.

The shielding electrode 88 is supplied with the common voltage and it includes longitudinal portions extending along the data lines 171 and transverse portions extending along the gate lines 121 to connect adjacent longitudinal portions. The longitudinal portions fully cover the data lines 171, while each of the transverse portions lies within the boundary of a gate line 121.

The shielding electrode 88 substantially blocks electromagnetic interference between the data lines 171 and the pixel electrodes 190 and between the data lines 171 and a common electrode 270 to reduce distortion of the voltage of the pixel electrodes 190 and a signal delay of the data voltages carried by the data lines 171.

The contact assistants 81 and 82 are connected to the end portions 129 of the gate lines 121 and the end portions 179 of the data lines 171 through the contact holes 181 and 182, respectively. The contact assistants 81 and 82 protect the end portions 129 and 179, respectively, and enhance the adhesion between the end portions 129 and 179 and external devices.

The description of the common electrode panel 200 follows with reference to FIGS. 2-4.

A light blocking member 220, referred to as a black matrix, for preventing light leakage is formed on an insulating substrate 210 such as transparent glass or plastic. The light blocking member 220 includes a plurality of rectilinear portions facing the data lines 171 on the TFT array panel 100 and a plurality of widened portions facing the TFTs on the TFT array panel 100. Alternatively, the light blocking member 220 may have a plurality of through-holes that face the pixel electrodes 190, the light blocking member 220 having substantially the same planar shape as the pixel electrodes 190.

A plurality of color filters 230 are also formed on the substrate 210, disposed substantially in the areas between the light blocking member 220. The color filters 230 may extend substantially along the longitudinal direction along the pixel electrodes 190. The color filters 230 may represent one of the primary colors such as red, green or blue.

An overcoat 250 is formed on a surface of the color filters 230 and the light blocking member 220 facing the TFT array panel 100. The overcoat 250 is preferably made of (organic) insulator and substantially prevents the color filters 230 from being exposed and provides a flat surface.

A common electrode 270 is formed on a surface of the overcoat 250 facing the TFT array panel 100. The common electrode 270 is preferably made of a transparent conductive material such as ITO and IZO and has a plurality of sets of cutouts 71, 72, 73, 74a, 74b, 75a, 75b, 76a and 76b.

A set of cutouts 71-76b face a pixel electrode 190 and include center cutouts 71, 72 and 73, lower cutout 74a, 75a and 76a and upper cutouts 74b, 75b and 76b. The cutout 71 is disposed near the contact hole 186 and each of the cutouts 72-76b is disposed between adjacent cutouts 91-95b of the pixel electrode 190 or between a cutout 95a or 95b and a chamfered edge of the pixel electrode 190. Each of the cutouts 71-76b has at least an oblique portion extending substantially parallel to the lower cutout 93a-95a or the upper cutout 93b-95b of the pixel electrode 190. The cutouts 71-76b substantially have inversion symmetry across the capacitive electrode 136.

Each of the lower and the upper cutouts 74a-76b includes an oblique portion, a transverse portion and a longitudinal portion or an oblique portion and a pair of longitudinal portions. The oblique portion extends approximately from a left edge, a lower edge, or an upper edge of the pixel electrode 190 approximately to a right edge of the pixel electrode 190. The transverse and longitudinal portions extend from respective ends of the oblique portion along edges of the pixel electrode 190, overlapping the edges of the pixel electrode 190, and making obtuse angles with the oblique portion.

Each of the center cutouts 71 and 72 includes a central transverse portion, a pair of oblique portions, and a pair of terminal longitudinal portions. The center cutout 73 includes a pair of oblique portions and a pair of terminal longitudinal portions. The central transverse portions of cutouts 71 and 72 are disposed near the left edge or a center of the pixel electrode 190 and extend along the capacitive electrode 136. The oblique portions extend from an end of the central transverse portion or approximately from a center of the right edge of the pixel electrode 190, approximately to the left edge of the pixel electrode. The oblique portions of the cutouts 71 and 72 make oblique angles with the respective central transverse portion and an oblique portion of the cutout 73 overlaps an oblique portion of a capacitive electrode 136 or a coupling electrode 176. The terminal longitudinal portions extend from the ends of the respective oblique portions along the left edge of the pixel electrode 190, overlapping the left edge of the pixel electrode 190, and making obtuse angles with the respective oblique portions.

The number of the cutouts 71-76b may be also varied depending on the design factors. The light blocking member 220 may overlap the cutouts 71-76b to block the light leakage through the cutouts 71-76b.

Alignment layers 11 and 21, which may be homeotropic, are coated on inner surfaces of the panels 100 and 200, and polarizers 12 and 22 are provided on outer surfaces of the panels 100 and 200 having crossed polarization axes, wherein one of the polarization axes may be parallel to the gate lines 121. One of the polarizers 12 and 22 may be omitted when the LCD is a reflective LCD.

The LCD may further include at least one retardation film (not shown) for compensating a retardation of the LC layer 3. The retardation film has birefringence and gives a retardation opposite to that given by the LC layer 3.

The LCD may further include a backlight unit (not shown) supplying light to the LC layer 3 through the polarizers 12 and 22, the retardation film, and the panels 100 and 200.

It is preferable that the LC layer 3 has negative dielectric anisotropy and is subjected to a vertical alignment, wherein the LC molecules in the LC layer 3 are aligned such that their long axes are substantially vertical to the surfaces of the panels 100 and 200 in the absence of an electric field. Accordingly, incident light cannot pass the crossed polarization system 12 and 22.

The LCD shown in FIGS. 1-4 is represented as an equivalent circuit shown in FIG. 5.

Referring to FIG. 5, a pixel of the LCD includes a TFT Q, a first subpixel including a first LC capacitor Clca and a storage capacitor Csta, a second subpixel including a second LC capacitor Clcb, and a coupling capacitor Ccp.

The first LC capacitor Clca includes an outer sub-pixel electrode 190a as one terminal, a portion of the common electrode 270 corresponding thereto as a second terminal, and a portion of the LC layer 3 disposed therebetween as a dielectric. Similarly, the second LC capacitor Clcb includes an inner sub-pixel electrode 190b as one terminal, a portion of the common electrode 270 corresponding thereto as a second terminal, and a portion of the LC layer 3 disposed thereon as a dielectric.

The storage capacitor Csta includes an expansion 177 of a drain electrode 175 as one terminal, a storage electrode 137 as a second terminal, and a portion of the gate insulating layer 140 disposed therebetween as a dielectric.

The coupling capacitor Ccp includes an inner sub-pixel electrode 190b and a capacitive electrode 136 as one terminal, a coupling electrode 176 as a second terminal, and portions of the passivation layer 180 and the gate insulating layer 140 disposed therebetween as a dielectric.

The first LC capacitor Clca and the storage capacitor Csta are connected in parallel to a drain of the TFT Q. The coupling capacitor Ccp is connected between the drain of the TFT Q and the second LC capacitor Clcb. The common electrode 270 is supplied with a common voltage Vcom and the storage electrode lines 131 may be supplied with the common voltage Vcom.

The TFT Q applies data voltages from a data line 171 to the first LC capacitor Clca and the coupling capacitor Ccp in response to a gate signal from a gate line 121. The coupling capacitor Ccp transmits the data voltage with a modified magnitude to the second LC capacitor Clcb.

If the storage electrode line 131 is supplied with the common voltage Vcom and each of the capacitors Clca, Csta, Clcb and Ccp and the capacitance thereof are denoted as the same reference characters, the voltage Vb charged across the second LC capacitor Clcb may be given by:

$$Vb = Va \times [Ccp/(Ccp+Clcb)],$$

where Va denotes the voltage of the first LC capacitor Clca.

Since the term Ccp/(Ccp+Clcb) is smaller than one, the voltage Vb of the second LC capacitor Clcb is greater than that of the first LC capacitor Clca. This inequality may be true for a case that the voltage of the storage electrode line 131 is not equal to the common voltage Vcom.

When the potential difference is generated across the first LC capacitor Clca or the second LC capacitor Clcb, an electric field substantially perpendicular to the surfaces of the panels 100 and 200 is generated in the LC layer 3. The pixel electrode 190 and the common electrode 270 are commonly referred to as field generating electrodes hereinafter. The LC molecules in the LC layer 3 tilt in response to the electric field such that their long axes are substantially perpendicular to the field direction. The degree of the tilt of the LC molecules determines the variation of the polarization of light incident on the LC layer 3. The variation of the light polarization is transformed into the variation of the light transmittance by the polarizers 12 and 22. In this way, the LCD displays images.

The tilt angle of the LC molecules depends on the strength of the electric field. Since the voltage Va of the first LC capacitor Clca and the voltage Va of the second LC capacitor Clcb are different from each other, the tilt direction of the LC molecules in the first subpixel is different from that in the second subpixel and thus the luminances of the two subpixels are different. For maintaining the average luminance of the two subpixels in a target luminance, the voltages Va and Vb of the first and the second subpixels can be adjusted so that an image viewed from a lateral side is the substantially similar to an image viewed from the front, thereby improving the lateral visibility.

The ratio of the voltages Va and Vb can be adjusted by varying the capacitance of the coupling capacitor Ccp. The coupling capacitance Ccp can be varied by changing the overlapping area and distance between the coupling electrode 176 and the inner sub-pixel electrode 190b (and the capacitive electrode 136). For example, the distance between the coupling electrode 176 and the inner sub-pixel electrode 190b increases when the capacitive electrode 136 is removed and the coupling electrode 176 is moved to the position of the capacitive electrode 136. Preferably, the voltage Vb of the second LC capacitor Clcb is from about 0.6 to about 0.8 times the voltage Va of the first LC capacitor Clca.

The voltage Vb charged in the second LC capacitor Clcb may be larger than the voltage Va of the first LC capacitor Clca. This can be realized by precharging the second LC capacitor Clcb with a predetermined voltage such as the common voltage Vcom.

The ratio of the outer subpixel electrode 190a of the first subpixel and the inner sub-pixel electrode 190b of the second subpixel is preferably from about 1:0.85 to about 1:1.15. Further, the number of the sub-pixel electrodes in each of the LC capacitors Clca and Clcb may be changed.

The tilt direction of the LC molecules is determined by a horizontal component generated by the cutouts 91-95b and 71-76b of the field generating electrodes 190 and 270 and the oblique edges of the pixel electrodes 190 distorting the electric field, which is substantially perpendicular to the edges of the cutouts 91-95b and 71-76b and the oblique edges of the pixel electrodes 190. Referring to FIG. 3, a set of the cutouts 91-95b and 71-76b divides a pixel electrode 190 into a plurality of sub-areas and each sub-area has two major edges. Since the LC molecules on each sub-area tilt substantially perpendicular to the major edges, the azimuthal distribution of the tilt directions are substantially localized to four directions, thereby increasing the reference viewing angle of the LCD.

The shapes and the arrangements of the cutouts 91-95b and 71-76b for determining the tilt directions of the LC molecules may be modified and at least one of the cutouts 91-95b and 71-76b can be substituted with protrusions (not shown) or depressions (not shown). The protrusions are preferably made of organic or inorganic material and disposed on or under the field-generating electrodes 190 or 270.

Since there is substantially no electric field between the shielding electrode 88 and the common electrode 270, the LC molecules on the shielding electrode 88 remain in an initial orientation and thus the light incident thereon is blocked. Accordingly, the shielding electrode 88 may serve as a light blocking member.

Now, a method of manufacturing a TFT array panel shown in FIGS. 1-4 will be described in detail.

A conductive layer preferably made of metal is deposited on an insulating substrate 110, for example, by sputtering, etc.

The conductive layer is subjected to lithography and etching to form a plurality of gate lines 121 including gate electrodes 124 and end portions 129, a plurality of storage electrode lines 131 including storage electrodes 137, and a plurality of capacitive electrodes 136.

A gate insulating layer 140 having a thickness of about 1,500-5,000 Å, an intrinsic amorphous silicon layer having a thickness of about 500-2,000 Å, and an extrinsic amorphous silicon layer having a thickness of about 300-600 Å are sequentially deposited. The extrinsic amorphous silicon layer and the intrinsic amorphous silicon layer are patterned by lithography and etching to form a plurality of extrinsic semiconductor islands and a plurality of intrinsic semiconductor islands 154.

A conductive layer having a thickness of about 1,500-3,000 Å is deposited, for example, by sputtering, etc., and patterned by lithography and etching to form a plurality of data lines 171 including source electrodes 173 and end portions 179, a plurality of drain electrodes 175 including expansions 177, and coupling electrodes 176 having through-holes 176H.

Exposed portions of the extrinsic semiconductor islands, which are not covered by the data lines 171 and the drain electrodes 175, are removed to form a plurality of ohmic contact islands 163 and 165 and to expose portions of the intrinsic semiconductor islands 154. Oxygen plasma treatment preferably follows to stabilize the exposed surfaces of the semiconductor islands 154.

An organic insulating film having positive photosensitivity is coated, exposed to light through a mask (not shown), and developed to form a passivation layer 180 having a plurality of contact holes 182 and 185 and upper portions of a plurality of contact holes 181 and 186. The mask used for forming the passivation layer 180 has light blocking areas, light transmitting areas, and translucent areas. When the mask is aligned with the substrate 110, the light transmitting areas face centers of the contact holes 181, 182, 185 and 186 and the translucent areas surround the light transmitting areas. The contact holes 181, 182, 185 and 186 have smooth or stepped sidewall profiles. The through-holes 176H are designed in consideration of the size of the contact holes 186. When the organic insulating film has negative photosensitivity, the transmittance of the areas in the mask is exchanged as compared with positive sensitivity.

Portions of the gate insulating layer 140 exposed through the upper portions of the contact holes 181 and 186 are removed to complete the contact holes 181 and 186.

When the data lines 171, the drain electrodes 175, the gate lines 121, or the capacitive electrodes 136 have Al upper films, portions of the Al upper films exposed through the contact holes 181, 182, 185 and 186 are removed by a blanket etch.

An ITO or IZO layer having a thickness of about 400-500 Å is deposited, for example, by sputtering, etc., and patterned by lithography and etching to form a plurality/of pixel electrodes 190, a shielding electrode 88, and a plurality of contact assistants 81 and 82.

An LCD according to an embodiment of the present invention will be described in detail with reference to FIGS. 6 and 7.

Figure 6:
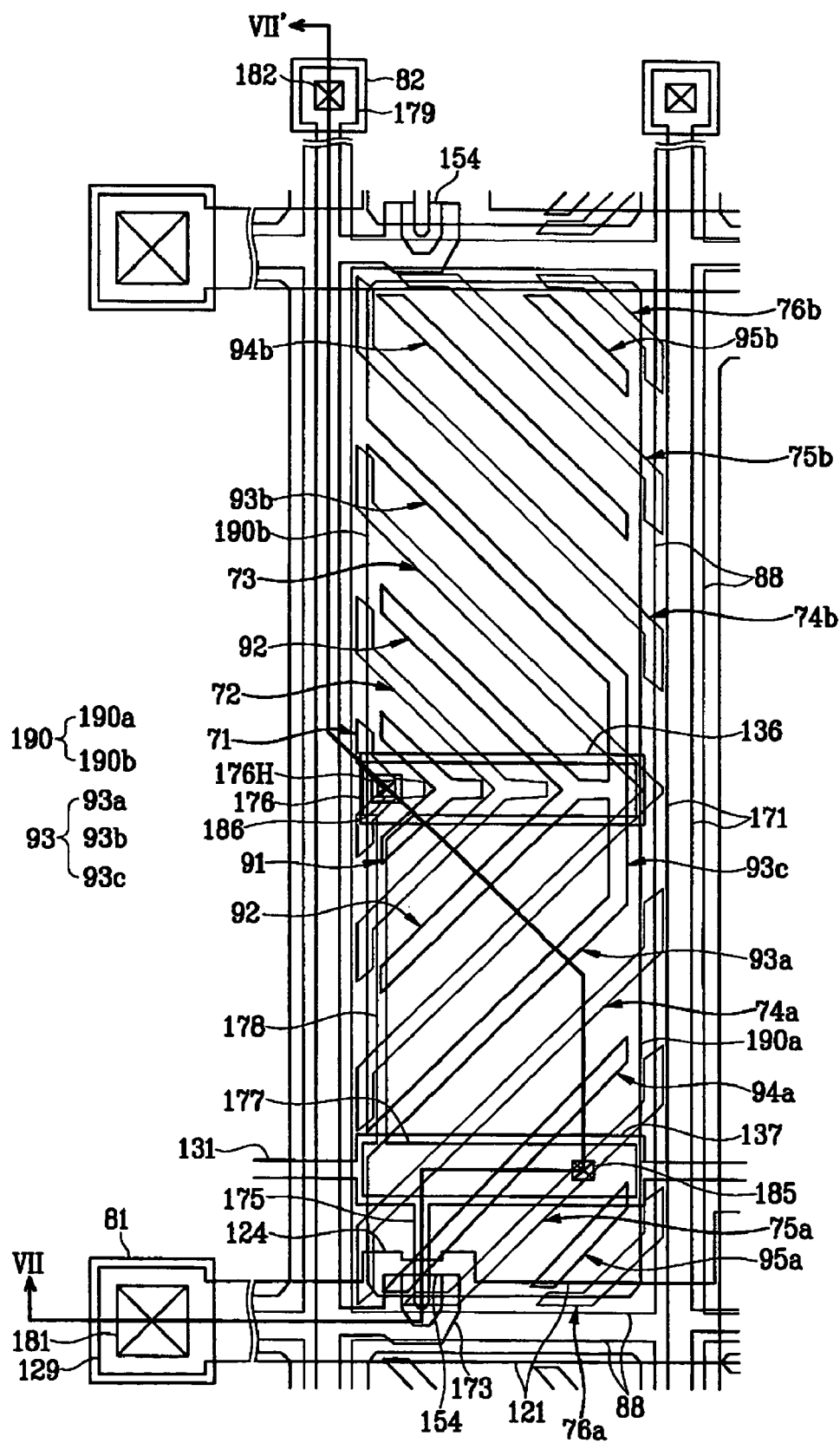
FIG. 6 is a layout view of an LCD according to another embodiment of the present invention.
Figure 7:
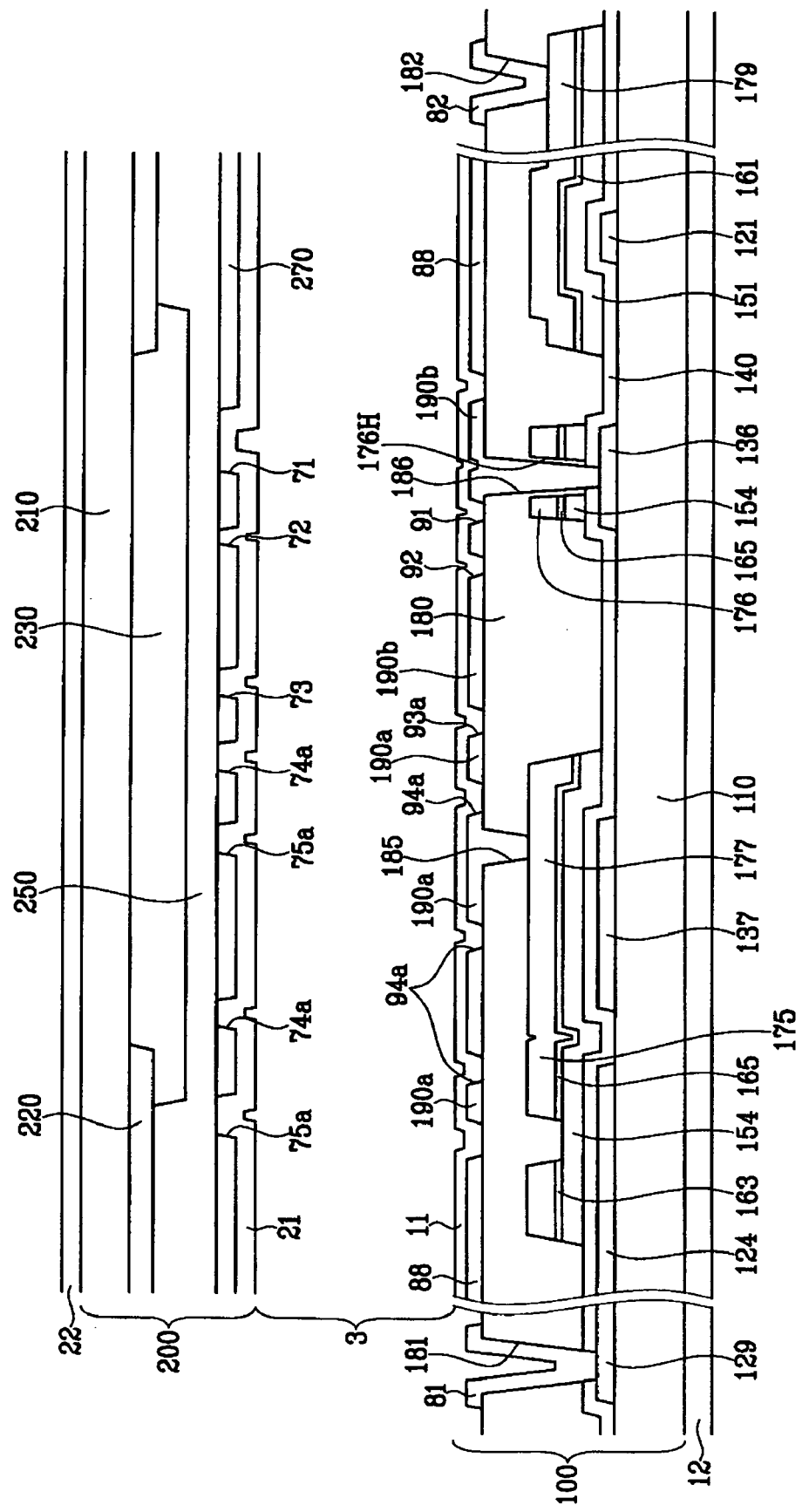
FIG. 7 is a sectional view of the LCD shown in FIG. 6 taken along line VII-VII'.

FIG. 6 is a layout view of an LCD according to an embodiment of the present invention, and FIG. 7 is a sectional view of the LCD shown in FIG. 6 taken along line VII-VII'.

Referring to FIGS. 6 and 7, an LCD includes a TFT array panel 100, a common electrode panel 200, a LC layer 3 interposed between the panels 100 and 200, and a pair of polarizers 12 and 22 attached on outer surfaces of the panels 100 and 200.

Layered structures of the panels 100 and 200 are substantially the same as those shown in FIGS. 1-4.

Regarding the TFT array panel 100, a plurality of gate lines 121, including gate electrodes 124 and end portions 129, a plurality of storage electrode lines 131, including storage electrodes 137, and a plurality of capacitive electrodes 136 are formed on a substrate 110. A gate insulating layer 140, a plurality of semiconductors 154, and a plurality of ohmic contacts 163 and 165 are sequentially formed on the gate lines 121 and the storage electrodes lines 131. A plurality of data lines 171, including source electrodes 173 and end portions 179, and a plurality of drain electrodes 175, including expansions 177, and coupling electrodes 176 are formed on the ohmic contacts 163 and 165. A passivation layer 180 is formed on the data lines 171, the drain electrodes 175, and exposed portions of the semiconductors 154. A plurality of contact holes 181, 182, 185 and 186 are provided through the passivation layer 180. The gate insulating layer 140 and the contact holes 186 pass through through-holes 176H provided at the coupling electrodes 176. A plurality of pixel electrodes 190 including subpixel electrodes 190a and 190b and having cutouts 91-95b, a shielding electrode 88, and a plurality of contact assistants 81 and 82 are formed on the passivation layer 180, and an alignment layer 11 is coated thereon.

Regarding the common electrode panel 200, a light blocking member 220, a plurality of color filters 230, an overcoat 250, a common electrode 270 having cutouts 71-76b, and an alignment layer 21 are formed on an insulating substrate 210 facing the TFT array panel 100.

Different from the LCD shown in FIGS. 1-4, the semiconductor islands 154 and the ohmic contacts 163 of the TFT array panel 100 extend along the data lines 171 to form a semiconductor island 151 and an ohmic contact 161. In addition, the semiconductor islands 154 have substantially the same planar shapes as the data lines 171 and the drain electrodes 175 as well as the underlying ohmic contacts 163 and 165. The semiconductor islands 154 include some exposed portions, which are not covered with the data lines 171 and the drain electrodes 175, such as portions located between the source electrodes 173 and the drain electrodes 175.

In addition, the capacitive electrodes 136 have no oblique portion, and each of the drain electrodes 175 includes an interconnection 178 extending substantially parallel to the data lines 171 and connecting the expansion 177 and the coupling electrode 176 near left sides thereof.

A manufacturing method of the TFT array panel according to an embodiment of the present invention simultaneously forms the data lines 171 and the drain electrodes 175, the semiconductor islands 151, and the ohmic contacts 161 and 165 using one photolithography step.

A photoresist masking pattern for the photolithography process has position-dependent thickness, and in particular, it has thicker portions and thinner portions. The thicker portions are located on wire areas that will be occupied by the data lines 171 and the drain electrodes 175, and the thinner portions are located on channel areas of TFTs.

The position-dependent thickness of the photoresist is obtained by several techniques, for example, by providing translucent areas on the exposure mask as well as transparent areas and light blocking opaque areas. The translucent areas may have a slit pattern, a lattice pattern, or a thin film(s) with intermediate transmittance or intermediate thickness. When using a slit pattern, it is preferable that the width of the slits or the distance between the slits is smaller than the resolution of a light exposer used for the photolithography. Another example is to use a reflowable photoresist. In detail, once a photoresist pattern made of a reflowable material is formed by using an exposure mask with transparent areas and opaque areas, it is subjected to a reflow process to flow onto areas without the photoresist, thereby forming thin portions.

As a result, the manufacturing process is simplified by omitting a photolithography step.

Many of the above-described features of the LCD shown in FIGS. 1-4 may be appropriate to the LCD shown in FIGS. 6 and 7.

An LCD according to an embodiment of the present invention will be described in detail with reference to FIG. 8.

Figure 8:
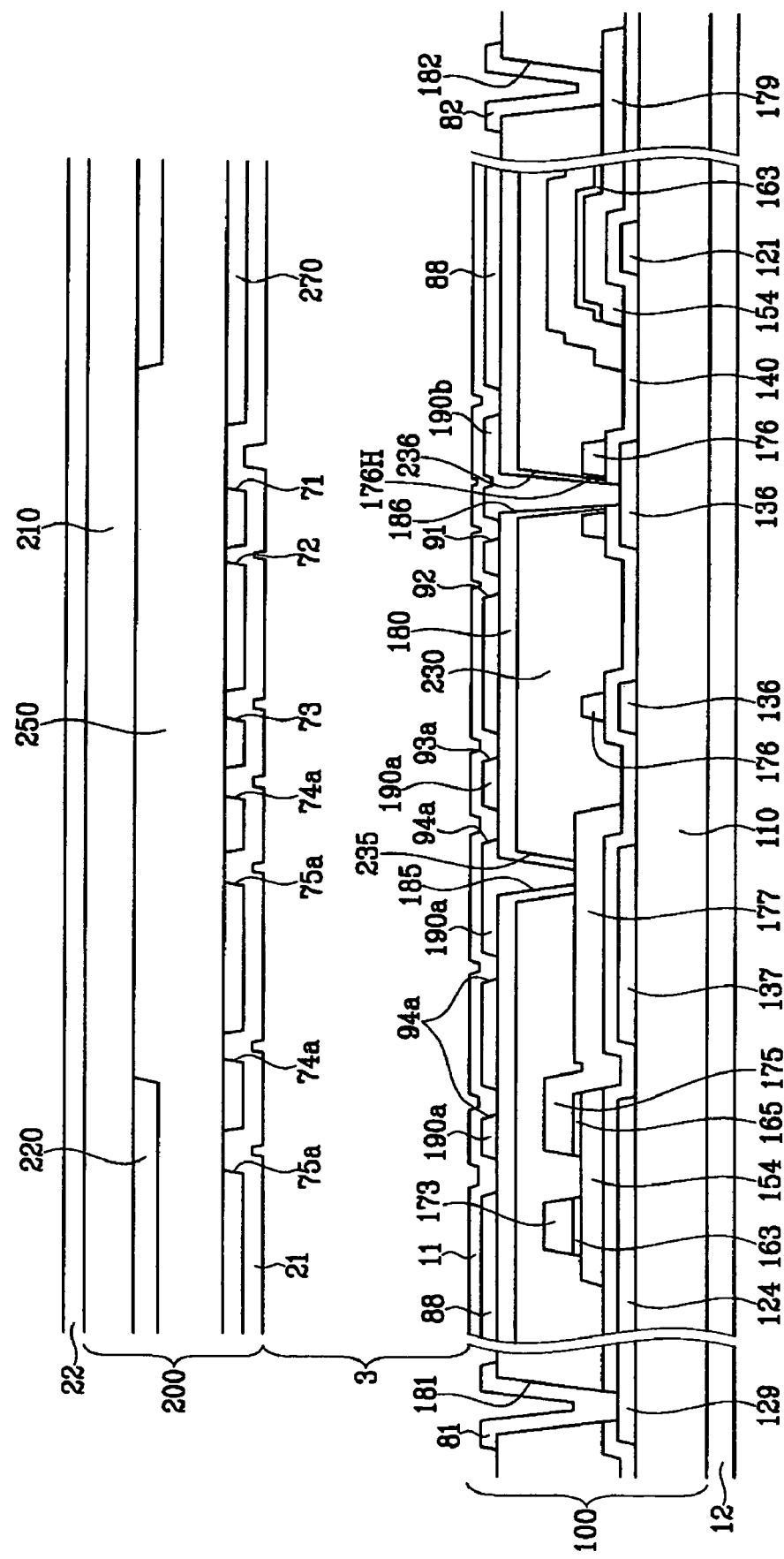
FIG. 8 is a sectional view of the LCD shown in FIG. 3 taken along line IV-IV' according to another embodiment of the present invention.

FIG. 8 is a sectional view of the LCD shown in FIG. 3 taken along line IV-IV'.

Referring to FIG. 8, an LCD includes a TFT array panel 100, a common electrode panel 200, a LC layer 3 interposed between the panels 100 and 200, and a pair of polarizers 12 and 22 attached on outer surfaces of the panels 100 and 200.

Layered structures of the panels 100 and 200 are substantially the same as those shown in FIGS. 1-4.

Regarding the TFT array panel 100, a plurality of gate lines 121 including gate electrodes 124 and end portions 129, a plurality of storage electrode lines 131 including storage electrodes 137, and a plurality of capacitive electrodes 136 are formed on a substrate 110. A gate insulating layer 140, a plurality of semiconductors islands 154, and a plurality of ohmic contacts 163 and 165 are sequentially formed on the gate lines 121 and the storage electrodes lines 131. A plurality of data lines 171 including source electrodes 173 and end portions 179 and a plurality of drain electrodes 175 including expansions 177 and coupling electrodes 176 are formed on the ohmic contacts 163 and 165 and the gate insulating layer 140. A passivation layer 180 is formed on the data lines 171, the drain electrodes 175, and exposed portions of the semiconductors 154. A plurality of contact holes 181, 182, 185 and 186 are provided through the passivation layer 180 and the gate insulating layer 140. The contact holes 186 pass through through-holes 176H provided at the coupling electrodes 176. A plurality of pixel electrodes 190 including subpixel electrodes 190a and 190b and having cutouts 91-95b, a shielding electrode 88, and a plurality of contact assistants 81 and 82 are formed on the passivation layer 180, and an alignment layer 11 is coated thereon.

Regarding the common electrode panel 200, a light blocking member 220, an overcoat 250, a common electrode 270 having cutouts 71-76b, and an alignment layer 21 are formed on a surface an insulating substrate 210 facing the TFT array panel 100.

Different from the LCD shown in FIGS. 1-4, the TFT array panel 100 includes a plurality of color filters 230 disposed under the passivation layer 180, while the common electrode panel 200 has no color filter. In this case, the overcoat 250 may be removed from the common electrode panel 200.

The color filters 230 are disposed between two adjacent data lines 171 and have a plurality of through-holes 235 and 236 through which the contact holes 185 and 186 pass through, respectively. The color filters 230 are not provided on peripheral areas provided with the end portions 129 and 179 of the signal lines 121 and 171.

The color filters 230 may extend along a longitudinal direction to form stripes and the edges of two adjacent color filters 230 may match with each other on the data lines 171. The color filters 230 may overlap each other to block light leakage between the pixel electrodes 190, or may be spaced apart from each other. When the color filters 230 overlap each other, linear portions of the light blocking member 220 may be omitted and the shielding electrode 88 may cover edges of the color filters 230. Overlapping portions of the color filters 230 may have a reduced thickness to decrease the height difference.

The color filters 230 may be disposed on the passivation layer 180, or the passivation layer 180 may be omitted.

Many of the above-described features of the LCD shown in FIGS. 1-4 may be appropriate to the LCD shown in FIG. 8.

While the present invention has been described in detail with reference to preferred embodiments, those skilled in the art will appreciate that various modifications and substitutions can be made thereto without departing from the spirit and scope of the present invention.

What is claimed is:

1. A thin film transistor array panel comprising:
   a substrate;
   a gate line disposed on the substrate;
   a capacitive electrode disposed on the substrate wherein the capacitive electrode is separated from the gate line and is disposed at the same layer as the gate line;
   a data line intersecting the gate line;
   a thin film transistor connected to the gate line and the data line and including a drain electrode;
   a coupling electrode connected to the drain electrode, disposed at the same layer as the drain electrode, overlapping the capacitive electrode, wherein a coupling capacitance is formed between the capacitive electrode and the coupling electrode;
   a passivation layer disposed on the gate line, the data line, and the thin film transistor and having a contact hole; and
   a pixel electrode including a first subpixel electrode connected to the drain electrode and a second subpixel electrode in contact with the capacitive electrode through the contact hole,
   wherein a planar area occupied by the contact hole is disposed within the coupling electrode.

2. The thin film transistor array panel of claim 1, wherein the coupling electrode has a through-hole disposed on the capacitive electrode, and wherein the contact hole exposes a portion of the capacitive electrode, the exposed portion of the capacitive electrode through the contact hole disposed in the through-hole.

3. The thin film transistor array panel of claim 2, wherein the through-hole is rectangular, octagonal, or circular.

4. The thin film transistor array panel of claim 2, wherein a distance between an edge of the contact hole and the through-hole is equal to or greater than about 3.0 microns.

5. The thin film transistor array panel of claim 1, wherein the contact hole has a stepped sidewall.

6. The thin film transistor array panel of claim 1, further comprising a shielding electrode separated from the pixel electrode and overlapping a portion of the data line or the gate line.

7. The thin film transistor array panel of claim 6, wherein the pixel electrode and the shielding electrode are disposed on the passivation layer.

8. The thin film transistor array panel of claim 6, further comprising a storage electrode overlapping the drain electrode.

9. The thin film transistor array panel of claim 1, wherein the pixel electrode has a chamfered corner.

10. The thin film transistor array panel of claim 1, wherein the passivation layer comprises an organic insulator.

11. The thin film transistor array panel of claim 10, further comprising a color filter disposed on or under the passivation layer.

12. The thin film transistor array panel of claim 1, wherein the pixel electrode comprises a partitioning member for partitioning the pixel electrode into a plurality of partitions.

13. The thin film transistor array panel of claim 12, wherein the partitioning member makes an angle of about 45 degrees with the gate line.

14. The thin film transistor array panel of claim 1, wherein the through-hole is substantially equidistant from two opposite edges of the capacitive electrode.

15. The thin film transistor array panel of claim 1, wherein the coupling electrode has a through-hole, and the through-hole is rectangular, octagonal, or circular.

16. The thin film transistor array panel of claim 1, wherein the coupling electrode has a through-hole, and a distance between an edge of the contact hole and the through-hole is equal to or greater than about 3.0 microns.

17. The thin film transistor array panel of claim 1, further comprising a shielding electrode separated from the pixel electrode and overlapping a portion of the data line or the gate line.

18. The thin film transistor array panel of claim 17, further comprising a storage electrode overlapping the drain electrode.

19. The thin film transistor array panel of claim 18, further comprising a color filter disposed on or under the passivation layer.

20. A thin film transistor array panel, comprising:
   a substrate;
   a gate line disposed on the substrate;
   a capacitive electrode disposed on the substrate wherein the capacitive electrode is separated from the gate line and is disposed at the same layer as the gate line;
   a data line intersecting the gate line;
   a thin film transistor connected to the gate line and the data line and including a drain electrode;
   a coupling electrode connected to the drain electrode, disposed at the same layer as the drain electrode, overlapping the capacitive electrode, wherein a coupling capacitance is formed between the capacitive electrode and the coupling electrode;
   a passivation layer disposed on the gate line, the data line, and the thin film transistor and having a contact hole; and
   a pixel electrode including a first subpixel electrode connected to the drain electrode and a second subpixel electrode in contact with the capacitive electrode through the contact hole,
   a shielding electrode separated from the pixel electrode and overlapping a portion of the data line or the gate line, and
   a storage electrode overlapping the drain electrode,
   wherein the shielding electrode and the storage electrode are supplied with substantially the same voltage.

21. The thin film transistor array panel of claim 20, wherein the shielding electrode extends along the data line or the gate lines.

22. The thin film transistor array panel of claim 21, wherein the shielding electrode fully covers the data line.

23. A method of manufacturing a thin film transistor array panel, the method comprising:
   forming a gate line and a capacitive electrode on a substrate;
   forming a gate insulating layer over the gate line, the capacitive electrode and the substrate;
   forming, simultaneously, a data line, a drain electrode, and a coupling electrode on the gate insulating layer, the coupling electrode having a through-hole disposed on the capacitive electrode, wherein a coupling capacitance is formed between the capacitive electrode and the coupling electrode;
   forming a passivation layer on the data line, the drain electrode, and the coupling electrode, the passivation layer having a contact hole that penetrates the through-hole and exposes the capacitive electrode; and
   forming a pixel electrode on the passivation layer, the pixel electrode including a first subpixel electrode in contact with the drain electrode and a second subpixel electrode connected to the capacitive electrode through the contact hole.

24. The method of claim 23, wherein the through-hole is substantially equidistant from two opposite edges of the capacitive electrode.

25. The method of claim 23, wherein the through-hole is rectangular, octagonal, or circular.

26. The method of claim 23, wherein the contact hole has a stepped sidewall.

* * * * *